(12) United States Patent
Pokorny et al.

(10) Patent No.: US 11,995,420 B2
(45) Date of Patent: May 28, 2024

(54) GENERATING A BUILD PROCESS FOR BUILDING SOFTWARE IN A TARGET ENVIRONMENT

(71) Applicant: RED HAT, INC., Raleigh, NC (US)

(72) Inventors: Fridolin Pokorny, Modry Kamen (SK); Christoph Goern, Bonn (DE); Francesco Murdaca, Milan (IT); Harshad Reddy Nalla, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 24 days.

(21) Appl. No.: 17/406,356

(22) Filed: Aug. 19, 2021

(65) Prior Publication Data
US 2023/0053820 A1    Feb. 23, 2023

(51) Int. Cl.
*G06F 9/44* (2018.01)
*G06F 8/41* (2018.01)
*G06F 8/61* (2018.01)
*G06F 8/71* (2018.01)
*G06F 8/77* (2018.01)
*G06F 9/445* (2018.01)
*G06F 9/455* (2018.01)

(52) U.S. Cl.
CPC ............... *G06F 8/44* (2013.01); *G06F 8/61* (2013.01); *G06F 8/71* (2013.01); *G06F 8/77* (2013.01)

(58) Field of Classification Search
CPC ..... G06F 8/44; G06F 8/61; G06F 8/71; G06F 8/77
See application file for complete search history.

(56) References Cited

U.S. PATENT DOCUMENTS

| | | | |
|---|---|---|---|
| 7,971,187 B2 | 6/2011 | Sanghvi et al. | |
| 8,832,647 B2 | 9/2014 | Cope et al. | |
| 9,519,477 B2 | 12/2016 | Champlin-Scharff et al. | |
| 10,127,146 B2 | 11/2018 | Moretto et al. | |
| 10,216,512 B1 * | 2/2019 | Mathew | G06F 8/41 |
| 10,671,384 B1 * | 6/2020 | Boynes | G06F 9/44526 |

(Continued)

FOREIGN PATENT DOCUMENTS

| | | | | |
|---|---|---|---|---|
| CN | 110020121 A | * | 7/2019 | |
| CN | 111242321 A | * | 6/2020 | G06F 11/3644 |

(Continued)

OTHER PUBLICATIONS

Liang Wei, Recommender Systems for Software Project Managers, Jun. 2021, pp. 412-417. https://dl.acm.org/doi/pdf/10.1145/3463274.3463951 (Year: 2021).*

(Continued)

*Primary Examiner* — Mongbao Nguyen
(74) *Attorney, Agent, or Firm* — Kilpatrick Townsend & Stockton LLP

(57) ABSTRACT

A build process for building software in a target environment can be generated using a system described herein. For example, the system can receive a recommended software-stack for a target software item to be built in a target build environment. The system can determine, based on the recommended software-stack, a build process for building the target software item in the target build environment. The system may then execute the build process to generate a software build of the target software item in the target build environment.

19 Claims, 3 Drawing Sheets

(56) References Cited

U.S. PATENT DOCUMENTS

| | | | |
|---|---|---|---|
| 10,698,668 B1* | 6/2020 | Pohlack | G06F 8/71 |
| 10,873,570 B2 | 12/2020 | Chaudhri | |
| 10,922,072 B1 | 2/2021 | Chouinard | |
| 11,288,061 B1* | 3/2022 | Johnson | G06F 8/51 |
| 11,288,166 B2 | 3/2022 | Goern et al. | |
| 2007/0055963 A1* | 3/2007 | Waddington | G06F 8/423 |
| | | | 717/140 |
| 2007/0214455 A1 | 9/2007 | Williams et al. | |
| 2011/0113424 A1 | 5/2011 | Ewington | |
| 2011/0258619 A1 | 10/2011 | Wookey | |
| 2012/0284380 A1 | 11/2012 | Anderson, III | |
| 2014/0089511 A1 | 3/2014 | McLean | |
| 2017/0090884 A1* | 3/2017 | Cawley | G06F 11/3668 |
| 2017/0102924 A1* | 4/2017 | Hussey | G06F 9/44505 |
| 2017/0185382 A1 | 6/2017 | Ranganathan | |
| 2017/0206069 A1 | 7/2017 | Erwin et al. | |
| 2017/0293695 A1* | 10/2017 | Brovman | G06Q 30/0251 |
| 2018/0157486 A1* | 6/2018 | Bezzi | G06F 8/71 |
| 2018/0314533 A1 | 11/2018 | Azhen et al. | |
| 2020/0034135 A1* | 1/2020 | Shi | G06N 20/00 |
| 2020/0117434 A1* | 4/2020 | Biskup | G06F 9/445 |
| 2020/0125996 A1* | 4/2020 | Paparaju | G06N 3/047 |
| 2020/0159536 A1* | 5/2020 | Saidi | G06F 9/455 |
| 2020/0272459 A1* | 8/2020 | Modeel | G06F 8/447 |
| 2020/0311600 A1 | 10/2020 | Kulkarni et al. | |
| 2020/0356360 A1* | 11/2020 | Gupta | G06F 17/16 |
| 2020/0387357 A1* | 12/2020 | Mathon | G06F 9/4411 |
| 2020/0389372 A1 | 12/2020 | Tian | |
| 2021/0081837 A1* | 3/2021 | Polleri | G06N 5/022 |
| 2021/0096892 A1* | 4/2021 | Nigro | G06F 9/45525 |
| 2021/0374558 A1* | 12/2021 | Tommasi | G06F 8/36 |
| 2022/0164209 A1* | 5/2022 | Yegorin | G06F 8/63 |
| 2022/0197633 A1* | 6/2022 | Kun | G06F 8/71 |
| 2022/0342673 A1* | 10/2022 | Wang | G06F 8/4441 |
| 2022/0350683 A1* | 11/2022 | Surendran | G06F 9/3887 |
| 2023/0004858 A1* | 1/2023 | Santhanagopal | G06F 8/20 |
| 2023/0145783 A1* | 5/2023 | Çördük | G06F 9/5072 |
| | | | 718/102 |

FOREIGN PATENT DOCUMENTS

| | | | | |
|---|---|---|---|---|
| CN | 112130866 A | 12/2020 | | |
| EP | 3432144 A1 * | 1/2019 | | |
| EP | 3572931 A1 * | 11/2019 | | G06F 8/36 |
| WO | 2011143455 A1 | 11/2011 | | |
| WO | WO-2019099008 A1 * | 5/2019 | | G06F 8/48 |
| WO | 2020209561 A1 | 10/2020 | | |

OTHER PUBLICATIONS

Davide Pizzolotto, Identifying Compiler and Optimization Options from Binary Code using Deep Learning Approaches, 2020, pp. 1-11. https://ieeexplore.ieee.org/stamp/stamp.jsp?tp=&arnumber=9240714 (Year: 2020).*

Collin McMillan, Recommending Source Code for Use in Rapid Software Prototypes, 2012, pp. 1-11. https://ieeexplore.ieee.org/stamp/stamp.jsp?tp=&arnumber=6227134 (Year: 2012).*

Zhipeng Li, Combinatorial Keyword Recommendations for Sponsored Search with Deep Reinforcement Learning, 2019, pp. 1-6. file:///C:/Users/mnguyen4/Documents/e-Red%20Folder/17406356/NPL%20Doc%20Li.pdf (Year: 2019).*

Nina Mazyavkina, Reinforcement Learning for Combinatorial Optimization: A Survey, 2020, pp. 1-24. https://arxiv.org/pdf/2003.03600.pdf (Year: 2020).*

Dods, S., "Creating a Robust Multi-Environment Build Setup for App Design," Kin and Carta Plc., 2016, https://www.kinandcarta.com/en/insights/2016/04/a-robust-multienvironment-build-setup/.

Gorodnitchi, O., "A Common Way of Managing Configurations for Multiple Environments (And Clouds)," 2019, https://itnext.io/a-standard-way-of-managing-configurations-for-multiple-environments-and-clouds-ee8d54703efc.

Jung, G., et al., "Generating Adaptation Policies for Multi-Tier Applications in Consolidated Server Environments," IEEE, Jun. 2-6, 2008, https://citeseerx.ist.psu.edu/viewdoc/download?doi=10.1.1.205.7710&rep=rep1&type=pdf.

"Introduction to the Machine Learning Stack," Mar. 16, 2019, https://hackernoon.com/introduction-to-the-machine-earning-stack-f5b64bba7602.

"MS Resolver™," Pattern Recognition Systems, Downloaded from Internet on Apr. 3, 2020, http://www.prs.no/MSResolver/MS Resolver.html.

Browne, C., et al., "A Survey of Monte Carlo Tree Search Methods," IEEE Transactions on Computational Intelligence and A1 In Games, 2012, http://www.incompleteideas.net/609%20dropbox/other%20readings%20and%20resources/MCTS-survey.pdf.

Bilbro, G., "Stochastic Search," Center for Communications and Signal Processing Department of Electrical and Computer Engineering, North Carolina State University, 1994, https://repository.lib.ncsu.edu/bitstream/handle/1840.4/1291/CCSP_1994_01.pdf?sequence=1&isAllowed=y.

U.S. Appl. No. 16/933,504, filed Jul. 20, 2020.

* cited by examiner

GENERATING A BUILD PROCESS FOR BUILDING SOFTWARE IN A TARGET ENVIRONMENT

TECHNICAL FIELD

The present disclosure relates generally to software builds. More specifically, but not by way of limitation, this disclosure relates to generating and executing a build process for building software in a target environment based on a recommended software-stack.

BACKGROUND

A software item, such as a software application, service, or package, may be built by a computing device out of various software components. The software components may include operating systems, architectural layers, protocols, runtime environments, databases, libraries, etc. A build process may be a process for determining which software components to use and how to configure the software components together to build the software item. In some cases, a build process may involve building a software item using a software-stack. A software-stack is a set of software components (e.g., packages) configured to work in tandem to produce a result or achieve a common goal. The software components may be stacked on top of each other in a hierarchy, such that at least some of the software components either directly or indirectly depend on others of the software components. For example, two well-known software-stacks are LAMP (Linux, Apache, MySQL, and PHP/Perl/Python) and WINS (Windows Server, IIS, .NET, and SQL Server). Software-stacks generally include all of the software components needed to run a particular software item so that no additional software is needed to support the software item.

DETAILED DESCRIPTION

Figure 1:
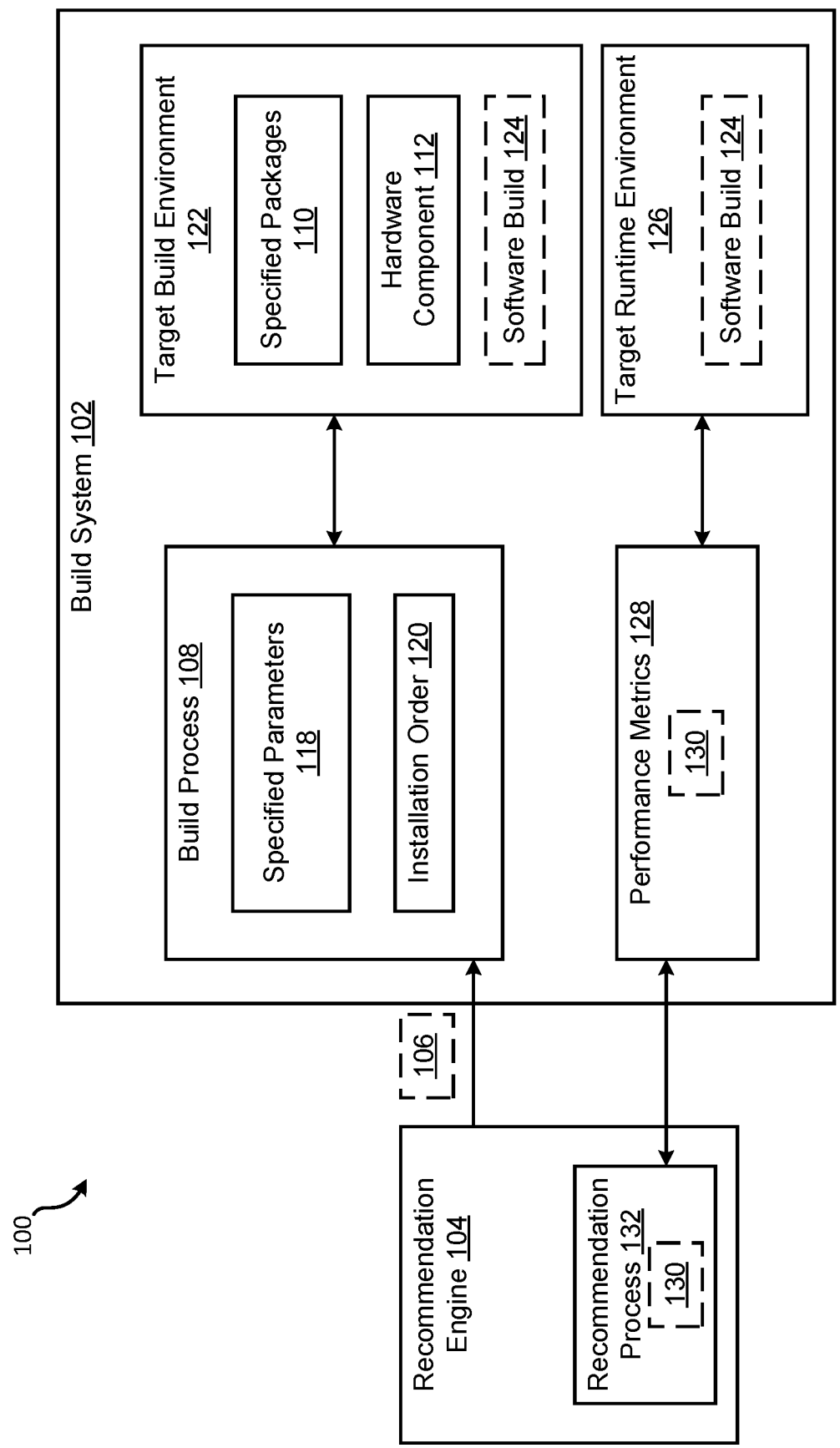
FIG. 1 is a block diagram of an example of a system for generating a build process for building a target software item based on a recommended software-stack according to some aspects of the present disclosure.

Building a software item, such as a software application, may involve combining and configuring software components in such a way as to create a software build of the software item. As there are may be a large number of possible combinations of software components usable to build a target software item, it may be difficult and time consuming to manually determine which combination of software components and hardware components to use for building a target software item in a target build environment. For example, there may be thousands or hundreds of thousands of possible combinations of software components, when considering that each software component may have multiple versions available and its own dependencies, that can be employed to build a target software item. There can also be different combinations of hardware components that can be employed in the target build environment to build the target software item. These factors can affect the quality of the software build, such that some combinations of software components and hardware components may yield software builds that are of significantly poorer quality (e.g., in terms of security, stability, or functionality) than other software builds. It can take considerable time and expertise on the part of a software developer to choose a combination of software components and hardware components that produces a suitable software build, which may still be suboptimal as compared to other possible options.

It may also be difficult for a software developer to manually determine and configure a build process for use in generating a software build. For example, the software developer may need to iteratively and manually adjust a build process over time based on issues that may arise in the build environment (during previous iterations of the build process) or in a target runtime environment (where the software build is to be deployed to be run). This can be a slow and error-prone process that can consume a large amount of computing resources (e.g., processing power, memory, and storage space).

Some examples of the present disclosure can overcome one or more of the abovementioned problems with a system that can determine a recommended software-stack usable in a build process for building a target software item, configure the build process based on the recommended software-stack, and then execute the build process to construct a software build for the target software item. More specifically, the system can determine the recommended software-stack using a recommendation engine. The recommendation engine can determine the recommended software-stack based on one or more characteristics of a target computing environment in which the target software item is to be built or is to run. For example, the recommendation engine can determine the recommended software-stack (e.g., a specified set of packages) for use in the build process based on the hardware characteristics or the software characteristics of the target build environment in which the target software item is to be built, the target runtime environment in which the target software item is to be deployed, or both. Upon receiving the recommended software-stack from the recommendation engine, the system can configure the build process and then execute the build process. In this way, the system can automatically determine a software-stack for use in the build process, configure the build process based on the recommended software-stack, and execute the build process. In some examples, the system may also deploy the software build to a target runtime environment, collect performance metrics associated with the deployed software build, and use the performance metrics to modify the recommendation engine so as to improve recommendation results over time.

As noted above, the system can configure the build process based on the recommended software-stack from the recommendation engine. This may involve selecting a target built environment for use in building the target software item; installing software packages in the target build environment; setting environment variables, software settings such as compiler flags, and other parameters in the target build environment; or any combination of these. Additionally or alternatively, configuring the build process can involve adjusting an ordering of build steps to be implemented during the build process, removing certain build steps from the build process, or adding build steps to the build process.

In some examples, the system may determine an adjustment to the build process that differs from the recommendations provided in the recommended software-stack. The adjustments may be made, for example, based on lack of access to recommended software or hardware, issues with the target build environment or target runtime environment, user-inputted restrictions to the system, etc. This may allow for certain customizations or overrides to be made with respect to the build process.

These illustrative examples are given to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 is a block diagram of an example of a system 100 for generating a build process 108 for building a target software item based on a recommended software-stack 106 according to some aspects of the present disclosure. The system 100 includes a build system 102. The build system 102 can include one or more computing devices, such as servers, laptop computers, desktop computers, or mobile devices (e.g., smartphone, tablet, or e-reader). The build system 102 may determine and execute a build process 108 for building a software build 124 of a target software item.

The build system 102 can provide inputs to and receive outputs from a recommendation engine 104, which may be internal or external to the build system 102. In particular, the build system 102 can transmit a request to the recommendation engine 104 for a software stack for use in a build process for building the target software item. The recommendation engine 104 can receive the request, determine a recommended software-stack 106 for the target software item, and output the recommended software-stack 106 to the build process 108.

In some examples, the recommendation engine 104 can determine the recommended software-stack 106 for the target software item by executing a recommendation process 132 that can involve executing a search algorithm to perform a search on a search space containing many or all possible combinations of the target software item and its dependencies. The search algorithm can be a heuristic search algorithm, such as a Monte-Carlo tree-analysis algorithm or a temporal-difference learning algorithm; a stochastic search algorithm, such as a simulated annealing algorithm; or another type of algorithm. The search algorithm may learn or be guided over time (e.g., between iterations) to more rapidly converge towards solutions, without having to test all of the possible combinations defined in the search space. This type of searching can be referred to as a combinatorial optimization problem, in which a space is searched for a local maximum or minimum that best satisfies an objective function. By solving this combinatorial optimization problem, the recommendation process 132 can rapidly determine a group of software-stack candidates that are most likely to yield the best results, where each of the software-stack candidates in the group has a unique combination of the software components in the search space. The group of software-stack candidates may be a relatively small subset of the total number of software-stack combinations that can be generated using all of the software components in the search space. For example, the group may include 100 thousand software-stack candidates, which may be a relatively small subset of 10 million total possibilities. In this way, the recommendation process 132 can significantly reduce the amount of software-stack candidates that will undergo further analysis.

During or after the search process, the recommendation process 132 can also determine respective scores for the software-stack candidates using a scoring function. In some examples, the scoring function can take into account hardware and software characteristics of one or more target computing environments, such as the target build environment 122 and/or a target runtime environment 126 in which the target software item is to execute. Additionally or alternatively, the scoring function can take into account security properties of the target software item and each of its dependencies. Additionally or alternatively, the scoring function can take into account performance properties of the target software item and each of its dependencies. The scoring function may also take into account other factors. Using a scoring function to characterize each of the software-stack candidates in this way can be faster and less resource-intensive than building and testing each of the software-stack candidates to verify application behavior.

After scoring the software-stack candidates, the recommendation engine 104 can select one of the software-stack candidates from the group as a recommended software-stack 106 based on its corresponding score. For example, the recommendation engine 104 can select whichever software-stack candidate in the group has the highest score or the lowest score, depending on the scoring function, as the recommended software-stack 106. The recommended software-stack 106 may be the best software stack for a given computing environment relative to the rest of the software-stack candidates in the group. The recommendation engine 104 may then transmit an output indicating the recommended software-stack 106 to the build system 102, which may use the recommended software-stack 106 to determine and execute a build process 108 for building a software build 124 of the target software item.

The recommended software-stack 106 may indicate certain hardware and software that is recommended for use in building the target software item. For example, the recommended software-stack 106 can specify certain hardware components or software packages that are to be included in a target build environment 122 to achieve a certain build result (e.g., an optimized build process). Examples of such hardware components may include a certain number and type of processor, non-volatile memory, and volatile-memory. Examples of such software packages may include an operating system, databases, libraries, or any combination of these. Some of the software packages may be considered required packages that must be used for proper completion of the build process 108 or proper operation at runtime.

After receiving the recommended software-stack 106, the build system 102 can determine (e.g., formulate) a build process 108 for building the target software item based on the recommended software-stack 106. In some examples, this may include selecting a target build environment 122 that includes or has access to the software packages (e.g., specified packages 110) and/or the hardware components 112 specified in the recommended software-stack 106. For example, the build system 102 can determine whether a local build environment has the recommended software packages or hardware components 112. If not, the build system 102 may select and initiate the build process 108 on a remote computing system that does have access to some or all of the specified packages 110 and hardware components 112. An example of the remote computing system can include a remote computing cluster.

In one specific example, the target software item can include a machine-learning model such as a neural network. The specified packages 110 may include machine learning libraries that may have certain build environment specifications. Examples of these specifications may include certain graphics processing unit ("GPU") models, certain kernels or versions of kernels, certain operating systems, certain nodes, etc. The build system 102 may determine which computing cluster has a target build environment 122 that includes the specified packages 110. In an example where the build system 102 is unable to determine a computing cluster that includes the specified packages 110, the build system 102 may reconfigure the build process 108 to determine a different computing cluster with different specified packages 110 or hardware components 112. The build process 108 may be executed using the different computing cluster to create a software build 124 for the target software item.

Determining the build process 108 may additionally or alternatively include determining specified parameters 118 of the specified packages 110 and an installation order 120 of the specified packages 110 based on the recommended software-stack 106. The specified parameters 118 may include configuration settings for configuring the specified packages 110. For example, the specified parameters 118 may include compiler flags or settings for use in compiling source code. The installation order 120 may be an order for installing the specified packages 110 in the target build environment 122. The installation order 120 may be determined based on dependencies among the specified packages 110.

As one particular example, TensorFlow is a popular Python library for building artificial intelligence or machine learning applications. The recommendation engine 104 may transmit a recommended software-stack 106 for a target software item that is a machine-learning application to the build system 102. The recommended software-stack 106 may include recommendations for certain versions of TensorFlow packages to use, other packages native to the build system 102 and their dependencies on one another and with the TensorFlow packages, files such as binary files and scripts to include in the machine-learning application, databases for training the machine-learning application, etc. In this example involving TensorFlow, the build system 102 may determine the build process 108 based on the recommendations. For example, the build system 102 can determine that the build process 108 is to include the native packages and the certain versions of the Tensor Flow packages. The build system 102 may also determine an available hardware component 112 (e.g., CPU type or GPU type) with characteristics that may allow for installing and configuring the specified packages 110. The installation order 120 may be determined based on the dependencies between the specified packages as provided in the recommended software-stack 106. For example, if the recommended software-stack 106 includes a first package that depends on a second package, the build system 102 may determine the installation order 120 that involves installing the second package before the first package.

In some examples, the build system 102 may also use the recommended dependencies and files provided in the recommended software-stack 106 to determine the specified parameters 118. For example, a first package may depend on a second package, but only if the second package has a specific configuration. Therefore, the build system 102 may determine a specified parameter 118 for the second package so that the second package may have the specific configuration. Additionally, if the recommended software-stack 106 includes a package accessing a certain database, the build system 102 may determine specified parameters 118 for which database to access, how the specified package 110 uses the database, etc.

Having formulated the build process 108 for the target software item, the build system 102 may execute the build process 108 to generate the software build 124 in a target build environment 122. Executing the build process may involve using the hardware component 112 to install the specified packages 110 in a certain installation order 120 and configuring the specified packages 110 and hardware component 112 to have specified parameters 118. In some examples, the build process may be stateless. This may allow the build process to be executed multiple times concurrently for multiple target software items. Although the target build environment 122 is shown in FIG. 1 as being internal to the build system 102, it will be appreciated that in other examples the target build environment 122 may be external to the build system 102. In some such examples, the build system 102 may execute the build process 108 by transmitting one or more commands to the target build environment 122 for causing the target build environment 122 to perform the build process.

After executing the build process 108 to generate the software build 124, the build system 102 may deploy the software build 124 in a target runtime environment 126. Although the target runtime environment 126 is shown in FIG. 1 as being internal to the build system 102, in other examples the target runtime environment 126 may be external to and accessible by the build system 102. In some examples, the target runtime environment 126 may be the same as target build environment 122. For example, the target build environment 122 and the target runtime environment 126 may be located in the same or different computing clusters that are inside or outside of the build system 102.

After the software build 124 has been built and deployed, the build system 102 may determine performance metrics 128 for the software build 124 in the target runtime environment 126. Examples of the performance metrics 128 may a memory consumption metric, a processor consumption metric, a bandwidth consumption metric, a latency metric, or any combination of these. In some examples, the performance metrics 128 may be obtained by testing the software build 124 in the target runtime environment 126. The test results may indicate any of the above metrics as well as other performance characteristics. For example, the test results may indicate whether the software build 124 runs properly in the target runtime environment 126, whether the software build 124 is an accurate build of the target software item, and the functional performance of the software build 124.

In some examples, the build system 102 may determine feedback 130 for the recommendation engine 104 based on the performance metrics 128. For example, the build system 102 may determine that its target build environment 122 may not have access to certain hardware or software included in the recommended software-stack 106. The build system 102 may configure the feedback 130 to indicate that the certain hardware or software is unavailable. In another example, the performance metrics 128 may indicate that the target software item has high latency. The build system 102 may analyze the software build 124 to determine that use of a certain version of a specified package 110 in the software build 124 may be a cause of the increased latency of the target software item. So, the build system 102 may configure the feedback 130 to indicate the high latency and to indicate that the certain version of the software package is a cause thereof. In some examples, the feedback 130 may take the form of one or more suggestions for changes to the recommendation process 132. The build system 102 may transmit the feedback 130 to the recommendation engine 104 over a network, such as a local area network or the Internet.

The recommendation engine 104 may receive the feedback 130 and adjust the recommendation process 132 based on the feedback 130. For example, the recommendation engine 104 can adjust a score or stored characteristic associated with one or more of the specified packages 110 based on the feedback 130. This feedback loop may allow the recommendation process 132 to be improved over time. In some examples, the build system 102 may provide the performance metrics 128 or the feedback 130 to a user via a display, which may be for example a liquid crystal display (LCD) or a light-emitting diode (LED) display, to allow the user to modify and improve the build process 108 or the recommendation process 132 accordingly.

Although FIG. 1 shows a certain number and arrangement of components, it will be appreciated that this is for illustrative purposes and not intended to be limiting. Other examples may include more components, fewer components, different components, or a different arrangement of the components shown in FIG. 1. For instance, the recommendation engine 104 may be part of the build system 102 in other examples.

Figure 2:
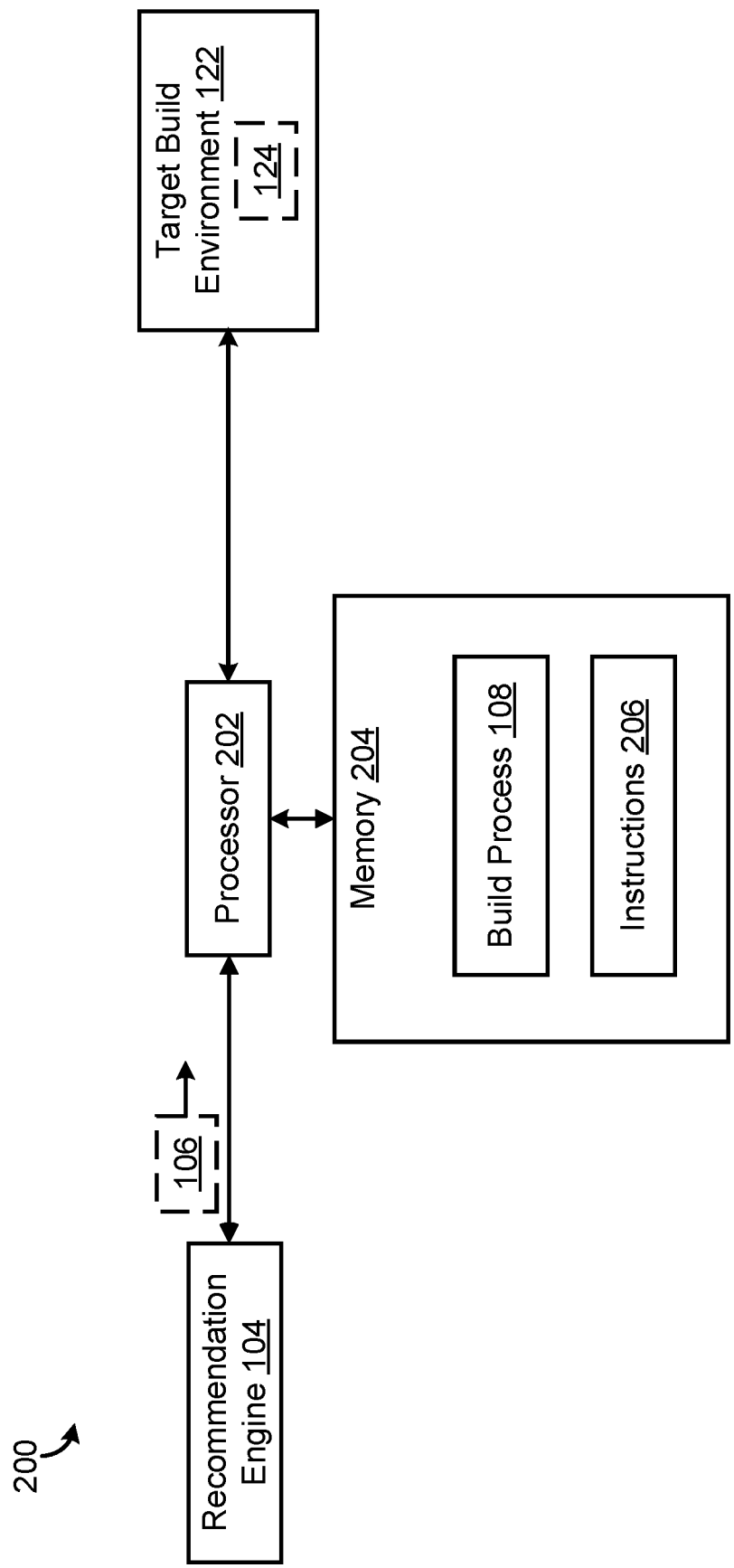
FIG. 2 is a block diagram of another example of a system for generating a build process for building a target software item based on a recommended software-stack according to some aspects of the present disclosure.

FIG. 2 is a block diagram of another example of a system 200 for generating a build process 108 for building a target software item based on a recommended software-stack 106 according to some aspects of the present disclosure. The system 200 includes a processor 202 communicatively coupled with a memory 204. In some examples, the processor 202 and the memory 204 can be included in the same housing (e.g., in the same computing device) or remote from one another.

The processor 202 can include one processor or multiple processors. Examples of the processor 202 include a Field-Programmable Gate Array (FPGA), an application-specific integrated circuit (ASIC), a microprocessor, or any combination of these. The processor 202 can execute instructions 206 stored in the memory 204 to perform operations. In some examples, the instructions 206 can include processor-specific instructions generated by a compiler or an interpreter from code written in any suitable computer-programming languages, such as C, C++, C#, etc.

The memory 204 can include one memory or multiple memories. In some examples, the memory 204 can be non-volatile such that it retains stored information when powered off. For instance, the memory 204 can include electrically erasable and programmable read-only memory (EEPROM), flash memory, or any other type of non-volatile memory. At least some of the memory 204 includes a non-transitory computer-readable medium from which the processor 202 can read instructions 206. A computer-readable medium can include electronic, optical, magnetic, or other storage devices capable of providing the processor 202 with computer-readable instructions or other program code. Examples of a non-transitory computer-readable medium can include magnetic disk(s), memory chip(s), ROM, random-access memory (RAM), an ASIC, a configured processor, optical storage, or any combination of these.

In some examples, the processor 202 can execute the instructions 206 to perform operations. For example, the processor 202 may receive a recommended software-stack 106 from a recommendation engine 104 for a target software item. The processor 202 may determine, based on the recommended software-stack 106, a build process 108 for a software build 124 of the target software item in a target build environment 122. The processor 202 may then execute the build process 108 to generate a software build 124 of the target software item in the target build environment 122.

In some examples, the processor 202 can deploy the software build 124 in a target runtime environment 126. After deploying the software build 124 in the target runtime environment 126, the processor 202 may determine performance metrics 128 for the software build 124 in the target runtime environment 126. The processor 202 may then transmit feedback 130 based on the performance metrics 128 to the recommendation engine 104. Based on the feedback 130, the recommendation engine 104 may reconfigure its recommendation process 132 for selecting recommended software-stacks 106, thereby improving the system 200.

Figure 3:
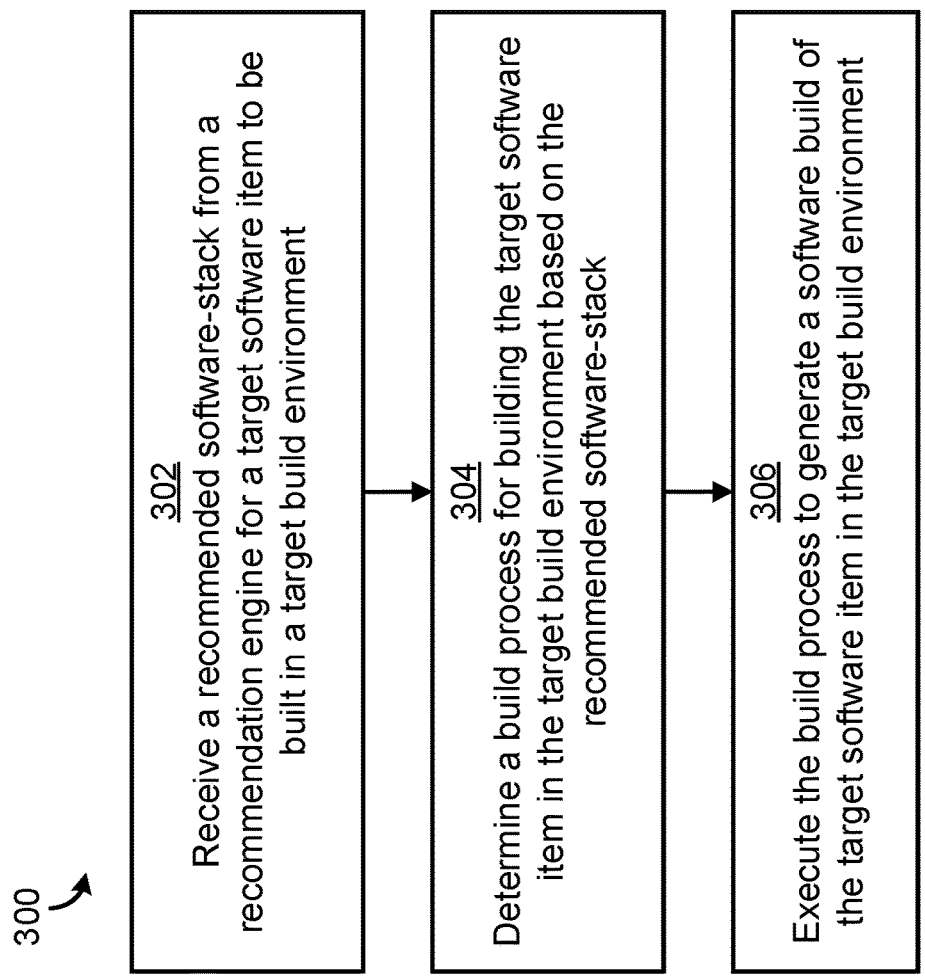
FIG. 3 is a flow chart of an example of a process for generating a build process for building a target software item based on a recommended software-stack according to some aspects of the present disclosure.

In some examples, the processor 202 can implement some or all of the steps shown in FIG. 3. Other examples can include more steps, fewer steps, different steps, or a different order of the steps than is shown in FIG. 3. Some or all of the steps may be repeated. The steps of FIG. 3 are discussed below with reference to the components discussed above from FIGS. 1-2.

In block 302, the processor 202 receives a recommended software-stack 106 from a recommendation engine 104 for a target software item to be built in a target build environment 122. The processor 202 can receive the recommended software-stack 106 as an electronic communication via a network, such as a local area network or the Internet.

In block 304, the processor 202 determines, based on the recommended software-stack 106, a build process 108 for a software build 124 of the target software item in the target build environment 122. Determining the build process 108 can involve determining how one or more aspects of the build process 108 are to be configured.

In some examples, the recommended software-stack 106 may include recommendations for software and hardware characteristics of the target build environment 122. So, the processor 202 may select a target build environment 122 that has access to the software and hardware characteristics. The processor 202 may then configure the build process 108 so as to be performed on the target built environment 122. For instance, the processor 202 may command a hardware component 112 of the target built environment 122 to obtain and install specified packages 110 in an installation order 120. The processor 202 may also command the hardware component 112 of the target built environment 122 to configure the specified packages 110 to have specified parameters 118. The processor 202 may then use the target built environment 122 to create the software build 124.

In some examples, determining the build process 108 may include determining a suitable (e.g., compatible) alternative to one or more software items specified in the recommended software-stack 106. For example, the processor 202 may identify a need for a suitable alternative for a particular software item if the software item is not accessible by the target build environment 122 or if the processor 202 has been previously configured by a user to avoid use of the one or more software items. The processor 202 may compare characteristics of the particular software item to one or more other software items that are available to identify a suitable alternative. For example, the recommended software-stack 106 may include a recommendation for software library that may not be available to the processor 202. So, the processor 202 may determine a different software library to be used in the build process 108, based on similarities between the functional characteristics of the two software libraries. In one example, the recommended software-stack 106 may include a recommendation for installing specified packages 110 from a public source. The processor 202 may be configured to not install specified packages 110 from public sources, for example due to security concerns. Therefore, the processor 202 may override the recommendation from the recommendation engine 104 to determine a private (e.g., corporate) source for accessing and installing the specified packages 110. In another example, the recommended software-stack 106 may include a recommendation for deploying the software build 124 using Advanced Vector Extensions ("AVX"), but the processor 202 may only have access to Advanced Vector Extensions 2 ("AVX2") nodes. So, the processor 202 may determine that AVX2 is an expansion of AVX and may configure the build process 108 to use nodes with AVX2 enabled.

In some examples, the build process 108 may be determined (e.g., adjusted) based on one or more characteristics of the target runtime environment 126. Examples of such characteristics can include the hardware characteristics, software characteristics, and geographical location of the target runtime environment. For example, the specified packages 110 may include databases for training a software build 124 for a target software item that is a machine learning model. If the software build 124 is to be deployed in a target runtime environment 126 located in the European Union ("EU"), the processor 202 can configure the build process 108 so that the software build 124 complies with EU laws or regulations, such as the General Data Protection Regulation ("GDPR"). For instance, the processor 202 may determine specified packages 110 that include databases that are specific to and cannot leave the EU.

In block 306, the processor 202 executes the build process 108 to generate a software build 124 of the target software item in the target build environment 122. This may involve commanding a compiler to compile source code or commanding an interpreter to interpret the source code. In some examples, the processor 202 can instruct the target build environment 122 to use the hardware components 112 to download the specified packages 110 to the target build environment 122, configure the specified packages 110 to have the specified parameters 118, and use the specified packages 110 to generate the software build 124.

Once the software build 124 is created, in some examples the processor 202 can deploy the software build 124 in a target runtime environment 126. The processor 202 may then perform additional operations on the software build 124 after deployment in the target runtime environment 126. For example, when the target software item is a machine learning model, the processor 202 may train the software build 124, such as with databases included in the specified packages 110.

In some examples, the processor 202 can determine performance metrics 128 for the software build 124 in the target runtime environment 126. The performance metrics 128 may indicate accuracy, efficiency, and latency. The performance metrics 128 may be determined by executing tests, which may include user-supplied programs or scripts for testing the software build 124. The processor 202 may be configured to monitor the software build 124 for issues.

In some examples, the processor 202 may execute multiple potential build processes 108 in one or more build environments and determine performance metrics 128 for each of the resulting software builds 124. The multiple potential build processes 108 may be determined by the processor 202 based on adjustments to the recommended software-stack 106. For example, if the recommended software-stack 106 recommends use of a software component that is unavailable to the processor 202, the processor 202 may generate multiple potential build processes that use available software components that the processor 202 has determined to be similar to the recommended software component. The processor 202 may execute the multiple potential build processes 108 in the one or more build environments and may determine performance metrics 128 for the software builds 124 of each potential build process 108. The processor 202 may determine which software build 124 to deploy in the target runtime environment 126 based on the results of the performance metrics 128. In some examples, the processor 202 may determine feedback 130 based on the performance metrics 128 and may transmit the feedback 130 to the recommendation engine 104. The recommendation engine 104 may adjust a recommendation process 132 for determining recommended software-stacks 106 based on the feedback 130.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a non-transitory memory including instructions that are executable by the processor for causing the processor to:
receive, from a recommendation engine, a recommended software-stack for a target software item to be built in a target build environment, wherein the recommendation engine is configured to generate the recommended software-stack using a combinatorial optimization algorithm configured to search a search space for a local minimum or maximum of combinations of dependencies of the target software item that satisfy an objective function to determine a group of software-stack candidates, wherein each software-stack candidate in the group of software-stack candidates has a unique combination of software components in the search space, wherein the recommendation engine is further configured to select the recommended software-stack for the target software item from the group of software-stack candidates;
determine, based on the recommended software-stack, a build process for building the target software item in the target build environment; and
execute the build process to generate a software build of the target software item in the target build environment.

2. The system of claim 1, wherein the non-transitory memory further includes instructions that are executable by the processor for causing the processor to:
deploy the software build in a target runtime environment;
determine performance metrics for the software build in the target runtime environment; and
provide feedback to the recommendation engine based on the performance metrics for the software build.

3. The system of claim 2, wherein the recommendation engine is configured to receive the feedback and adjust a recommendation process for recommending software-stacks based on the feedback.

4. The system of claim 1, wherein the instructions are further executable by the processor for causing the processor to:
identify, based on the recommended software-stack, specified packages for generating the software build;
determine an installation order for the specified packages; and
install the specified packages in the target build environment in the installation order.

5. The system of claim 1, wherein the instructions are further executable by the processor for causing the processor to:
determine, based on the recommended software-stack, a hardware component to be used in executing the build process;
select a computing cluster having access to the hardware component; and
execute the build process using the computing cluster.

6. The system of claim 1, wherein the build process is stateless, and wherein the instructions are further executable by the processor for causing the processor to execute the build process multiple times concurrently for a plurality of target software items.

7. A method comprising:
receiving, by a processor and from a recommendation engine, a recommended software-stack for a target software item to be built in a target build environment, wherein the recommendation engine is configured to generate the recommended software-stack using a combinatorial optimization algorithm configured to search a search space for a local minimum or maximum of combinations of dependencies of the target software item that satisfy an objective function to determine a group of software-stack candidates, wherein each software-stack candidate in the group of software-stack candidates has a unique combination of software components in the search space, wherein the recommendation engine is further configured to select the recommended software-stack for the target software item from the group of software-stack candidates;
determining, by the processor and based on the recommended software-stack, a build process for building the target software item in the target build environment; and
executing, by the processor, the build process to generate a software build of the target software item in the target build environment.

8. The method of claim 7, further comprising:
deploying, by the processor, the software build in a target runtime environment, wherein the target build environment is different from the target runtime environment;
determining, by the processor, performance metrics for the software build in the target runtime environment; and
providing, by the processor, feedback to the recommendation engine based on the performance metrics for the software build.

9. The method of claim 8, wherein the recommendation engine is configured to receive the feedback and adjust a recommendation process for recommending software-stacks based on the feedback.

10. The method of claim 7, further comprising:
identifying, by the processor and based on the recommended software-stack, specified packages for generating the software build;
determining, by the processor, an installation order for the specified packages; and
installing, by the processor, the specified packages in the target build environment in the installation order.

11. The method of claim 7, further comprising:
determining, by the processor and based on the recommended software-stack, a hardware component to be used in executing the build process;
selecting, by the processor, a computing cluster having access to the hardware component; and
executing, by the processor, the build process using the computing cluster.

12. The method of claim 7, wherein the build process is stateless, and wherein the build process is executed by the processor multiple times concurrently for a plurality of target software items.

13. A non-transitory computer-readable medium including instructions that are executable by a processor for performing operations comprising:
receiving, from a recommendation engine, a recommended software-stack for a target software item to be built in a target build environment, wherein the recommendation engine is configured to generate the recommended software-stack using a combinatorial optimization algorithm configured to search a search space for a local minimum or maximum of combinations of dependencies of the target software item that satisfy an objective function to determine a group of software-stack candidates, wherein each software-stack candidate in the group of software-stack candidates has a unique combination of software components in the search space, wherein the recommendation engine is further configured to select the recommended software-stack for the target software item from the group of software-stack candidates;
determining, based on the recommended software-stack, a build process for building the target software item in the target build environment; and
executing the build process to generate a software build of the target software item in the target build environment.

14. The non-transitory computer-readable medium of claim 13, wherein the operations further comprise:
deploying the software build in a target runtime environment;
determining performance metrics for the software build in the target runtime environment; and
providing feedback to the recommendation engine based on the performance metrics for the software build.

15. The non-transitory computer-readable medium of claim 14, wherein the recommendation engine is configured to receive the feedback and adjust a recommendation process for recommending software-stacks based on the feedback.

16. The non-transitory computer-readable medium of claim 13, wherein the operations further comprise:
identifying, based on the recommended software-stack, specified packages for generating the software build;
determining an installation order for the specified packages; and
installing the specified packages in the target build environment in the installation order.

17. The system of claim 1, wherein the non-transitory memory further includes instructions that are executable by the processor for causing the processor to:
- determine environment variables based on the recommended software-stack; and
- execute the build process at least in part by setting the environment variables.

18. The system of claim 1, wherein the non-transitory memory further includes instructions that are executable by the processor for causing the processor to, prior to executing the build process:
- determine that a software item or hardware component recommended in the recommended software-stack is inaccessible to the processor; and
- in response to determining that the software item or hardware component is inaccessible to the processor:
- identify an alternative software item or hardware component; and
- configure the build process to exclude the software item or hardware component and to include the alternative software item or hardware component.

19. The system of claim 1, wherein the non-transitory memory further includes instructions that are executable by the processor for causing the processor to:
- determine compiler flags based on the recommended software-stack; and
- execute the build process to generate the software build of the target software item in the target build environment, wherein executing the build process involves setting the compiler flags.

\* \* \* \* \*